United States Patent
Kasai et al.

(10) Patent No.: US 8,997,964 B2
(45) Date of Patent: Apr. 7, 2015

(54) LOAD SENSITIVE MAGNETIC CLUTCH DEVICE

(75) Inventors: Takayuki Kasai, Yamanashi (JP); Kazumitsu Ishikawa, Yamanashi (JP)

(73) Assignee: KITO Corporation, Yamanashi (JP)

(*) Notice: Subject to any disclaimer, the term of this patent is extended or adjusted under 35 U.S.C. 154(b) by 102 days.

(21) Appl. No.: 13/819,443

(22) PCT Filed: Aug. 30, 2011

(86) PCT No.: PCT/JP2011/069555
§ 371 (c)(1),
(2), (4) Date: Apr. 26, 2013

(87) PCT Pub. No.: WO2012/029754
PCT Pub. Date: Mar. 8, 2012

(65) Prior Publication Data
US 2013/0206534 A1    Aug. 15, 2013

(30) Foreign Application Priority Data
Aug. 31, 2010    (JP) .................................. 2010-193860

(51) Int. Cl.
| | | |
|---|---|---|
| F16D 27/01 | (2006.01) | |
| F16D 27/14 | (2006.01) | |
| B66D 3/16 | (2006.01) | |
| F16D 43/202 | (2006.01) | |
| F16H 3/54 | (2006.01) | |
| F16D 23/12 | (2006.01) | |

(52) U.S. Cl.
CPC ................. *F16D 27/14* (2013.01); *F16D 27/01* (2013.01); *F16D 2023/123* (2013.01); *B66D 3/16* (2013.01); *F16D 43/2024* (2013.01); *F16H 3/54* (2013.01)

(58) Field of Classification Search
None
See application file for complete search history.

(56) References Cited

U.S. PATENT DOCUMENTS

| | | | | |
|---|---|---|---|---|
| 2,409,557 A | * | 10/1946 | Gilfillan et al. | 192/13 R |
| 2,876,878 A | * | 3/1959 | Sinclair et al. | 192/69.91 |
| 3,240,304 A | * | 3/1966 | Wickersham | 192/56.42 |
| 3,666,064 A | * | 5/1972 | Bird et al. | 192/84.3 |
| 4,905,805 A | * | 3/1990 | Grimm | 192/48.3 |

FOREIGN PATENT DOCUMENTS

| | | | |
|---|---|---|---|
| JP | 2010-116957 | * | 5/2010 |
| JP | 2011-106666 | | 6/2011 |

OTHER PUBLICATIONS

Machine translation of JP2010-116957.*

* cited by examiner

*Primary Examiner* — Gene Crawford
*Assistant Examiner* — Mark Manley
(74) *Attorney, Agent, or Firm* — Wenderoth, Lind & Ponack, L.L.P.

(57) ABSTRACT

A load sensitive magnetic clutch device includes: a magnetic pole rotating body having magnetic poles arranged on the circumference thereof and provided with a clutch projection of a claw clutch at an end thereof; a yoke rotating body configured to rotate about an axial center of rotation identical to that of the magnetic pole rotating body; and a high-torque input member configured to rotate about the identical axial center of rotation and having a clutch engaging portion engaging the clutch projection. The clutch projection is formed of a magnetic body. The clutch engaging portion includes a clutch retaining magnetic body configured to attract the clutch projection by a magnetic force. The clutch projection is attracted by the clutch retaining magnetic body by an application of a load torque exceeding a torque which is transferrable between the magnetic pole rotating body and the yoke rotating body.

6 Claims, 8 Drawing Sheets

(b)

(a)

(b)

(a)

LOAD SENSITIVE MAGNETIC CLUTCH DEVICE

TECHNICAL FIELD

The present invention relates to a load sensitive magnetic clutch device configured to transmit a rotational torque by a magnetic attracting force between two rotating bodies.

BACKGROUND ART

In a load sensitive magnetic clutch device configured to transmit a rotational torque by a magnetic attracting force between two rotating bodies, a magnetic clutch device configured to automatically slide the rotating body in the direction of an axis of rotation by an action of the magnetic attracting force when a load torque exceeding the rotational torque which can be transmitted by the magnetic attracting force is applied, and switching a rotational torque transmitting route between a low-load transmitting route and a high-load transmitting route in accordance with the magnitude of the load torque using the sliding action of the rotating body, was proposed by the present applicant (Patent Literature 1).
Patent Literature 1: Patent Application No. 2010-189080

SUMMARY OF THE INVENTION

Technical Problem

The magnetic clutch device is configured to slide output rotating means to engage the output rotating means with high-torque rotating means and switch a torque transmitting route to a high-load transmitting route when a load torque exceeding a value set in advance is applied between the output rotating means and low-torque rotating means, move a magnetic pole of the output rotating means to a position facing a tooth-shaped magnetic body of the low-torque rotating means so that the switching of the toque transmitting route to a low-load transmitting route when the load torque is decreased to a level lower than a magnetic attracting force between the magnetic pole and a side magnetic body, and the switching of a magnetic clutch is performed automatically in association with increase and decrease of the load torque.

For example, however, in an application to a manual chain block, there is a problem in that the load torque applied to a clutch portion during a hoisting operation of a load is reduced by an action of a mechanical brake (load operation brake) provided on the manual chain block, and hence a clutch return in which the torque transmitting route is switched to the low-load transmitting route occurs.

It is an object of the present invention to provide a load sensitive magnetic clutch device configured to be capable of switching a load torque transmitting route from a low-load transmitting route to a high-load transmitting route quickly and reliably in a load sensitive magnetic clutch, and capable of preventing occurrence of a clutch return in which the load torque transmitting route of the clutch is switched from the high-load transmitting route to the low-load transmitting route due to the variability of the load applied to a clutch portion.

Solution to the Problem

The present invention, solving the above-described problem, includes a magnetic pole rotating body having magnetic poles arranged on the circumference thereof and forming output rotating means provided with a clutch projection of a claw clutch at an end thereof. A yoke rotating body is configured to rotate about an axial center of rotation identical to that of the magnetic pole rotating body, including a tooth-shaped portion arranged so that tooth tips face the magnetic poles, and forming low-torque input means provided with the magnetic pole rotating body and a tooth-shaped magnetic body configured to transmit a torque caused by a magnetic attracting force. A high-torque input means is configured to rotate about the identical axial center of rotation and having a clutch engaging portion of the claw clutch engaging the clutch projection provided on the output rotating means. The clutch projection is formed of a magnetic body. The clutch engaging portion includes a clutch retaining magnetic body configured to attract the clutch projection by a magnetic force, and the clutch projection is attracted by the clutch retaining magnetic body by an application of a load torque exceeding a torque which is transferrable between the magnetic pole rotating body and the low-torque input means.

Also, the load sensitive magnetic clutch device includes a hollow disk-shaped side magnetic body mounted on the yoke rotating body on the side of the row of the tooth-shaped magnetic body on the side where the high-torque input means is arranged, and the clutch engaging portion of the high-torque input means includes a forward rotation torque transmitting side surface configured to engage the clutch projection when the high-torque input means rotates in the forward direction and a reverse rotation torque transmitting side surface configured to engage the clutch projection when the high-torque input means rotates in the reverse direction.

Also, the clutch retaining magnetic body includes a claw clutch disengaging portion configured to reduce an attracting force caused by the magnetic force between the clutch projection and the clutch retaining magnetic body at an intermediate portion between the forward rotation torque transmission side surface and the reverse rotation torque transmitting side surface.

Also, the claw clutch disengaging portion is a clutch disengaging bevel provided at a center portion of the clutch retaining magnetic body, configured to reduce the attracting force generated by the magnetic force between the clutch projection and the clutch retaining magnetic body.

Also, the claw clutch disengaging portion is a claw clutch disengagement projection configured to abut against the clutch projection to disengage the attraction caused by the magnetic force between the clutch projection and the clutch retaining magnetic body.

Also, the clutch engaging portion includes the clutch retaining magnetic body only on either between the forward rotation torque transmitting side surface and the claw clutch disengaging portion or between the reverse rotation torque transmitting side surface and the claw clutch disengaging portion.

Advantageous Effects of the Invention

According to the present invention, since the configuration includes: the magnetic pole rotating body having the magnetic poles arranged on the circumference thereof and forming the output rotating means provided with the clutch projection of the claw clutch at the end thereof; the yoke rotating body configured to rotate about the axial center of rotation identical to that of the magnetic pole rotating body, including the tooth-shaped portion arranged so that the tooth tips face the magnetic poles, and forming the low-torque input means provided with the magnetic pole rotating body and the tooth-shaped magnetic body configured to transmit the torque caused by the magnetic attracting force; and the high-torque input means configured to rotate about the identical axial center of rotation and having the clutch engaging portion of the claw clutch engaging the clutch projection provided on the output rotating means, when a load torque exceeding a preset rotational torque is applied between the output rotating means and the low-torque rotating means, the output rotating means slides in the direction of the axial center of rotation by a predetermined amount. This allows switching the transmission of the rotational torque from the route of the output rotating means and the low-torque rotating means to the route of the output rotating means and the high-torque rotating means in a simple configuration. Therefore, a reduction in size of the device, reliability of the clutch switching, and reduction of manufacturing cost are realized. In addition, since the engagement between the output rotating means and the high-torque input means is achieved by the claw clutch, an advantage that the switching of transmission to the high-torque rotating means is achieved simply and reliably. Furthermore, since the clutch retaining magnetic body is provided on the clutch engaging portion of the high-torque input means, the clutch projection is attracted by the clutch retaining magnetic body, so that the engagement action of the claw clutch is achieved quickly and reliably. Also, since the clutch projection attracted by the magnetic force is attracted by the clutch retaining magnetic body, occurrence of the clutch return may be prevented.

Also, since the hollow disk-shaped side magnetic body mounted on the yoke rotating body on the side of the row of the tooth-shaped magnetic body on the side where the high-torque input means is arranged is provided, the low-load transmission can be switched to the high-load transmission reliably by sliding the output rotating means toward the high-torque means in association with the increase in the load torque to bring the clutch projection and the clutch engaging portion into engagement. Also, since the high-torque input means includes the forward rotation torque transmission side surface and the reverse rotation torque transmission side surface, a clutch engagement suitable for the respective operations of the forward rotation and the reverse rotation may be selected as needed. Also, since the claw clutch disengaging portion is provided on the clutch retaining magnetic body, the operation for switching the output rotating means from the high-torque input means to the low-torque input means when the torque between the output rotating means and the high-torque input means is reduced is achieved by rotating the high-torque input means in the reverse direction, and hence relatively moving the clutch projection retained by the clutch retaining magnetic body to the claw clutch disengaging portion to reduce the attracting force between the clutch projection and the clutch retaining magnetic body and switching the output rotating means to the transmission from the high-torque input means to the low-torque input means by a magnetic force applied between the magnetic poles and the tooth-shaped portion of the tooth-shaped magnetic body, whereby the clutch may be switched smoothly to a mode in which the low load is transmitted.

Also, since the claw clutch disengagement projection is provided at the intermediate portion between the forward rotation torque transmitting side surface and the reverse rotation torque transmitting side surface of the clutch engaging portion of the high-torque input means, the operation for switching from the high-torque input means to the low-torque input means performed by the output rotation means is achieved by rotating the high-torque input means in the direction opposite to the direction of rotation of the previous operation to cause the clutch projection to abut against the claw clutch disengagement projection, thereby disengaging the claw clutch from the clutch retaining magnetic body. Therefore, the output rotating means can be switched reliably from the high-torque input means to the low-torque input means so that the clutch can be switched smoothly to a mode in which the low load is transmitted. Also, since the clutch holding magnetic body is arranged either between the forward rotation torque transmission side surface and the claw clutch disengaging portion or between the reverse rotation torque transmitting side surface and the claw clutch disengaging portion, a claw clutch retaining function is achieved only during the operation of either the forward rotation or the reverse rotation, and the claw clutch retaining function is not achieved in other operation, so that selection according to the application may be achieved as needed so that the transmitting route of the torque is automatically switched to a low-load torque transmitting route when the torque is lowered to a predetermined torque or below.

EMBODIMENTS

An embodiment of the present invention will be described below.

Figure 1:
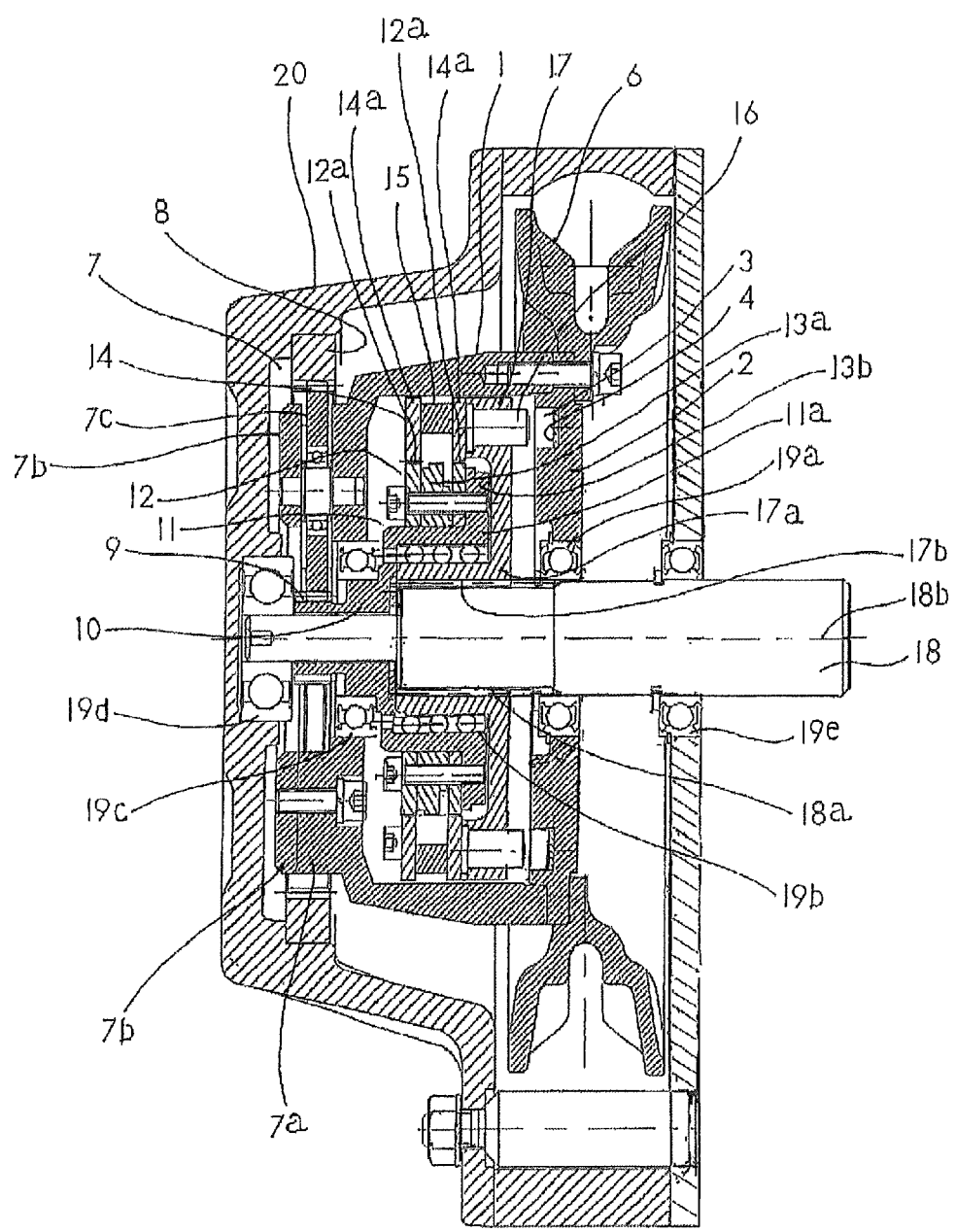
FIG. 1 is a general configuration drawing of a load sensitive magnetic clutch device of the present invention.
Figure 2:
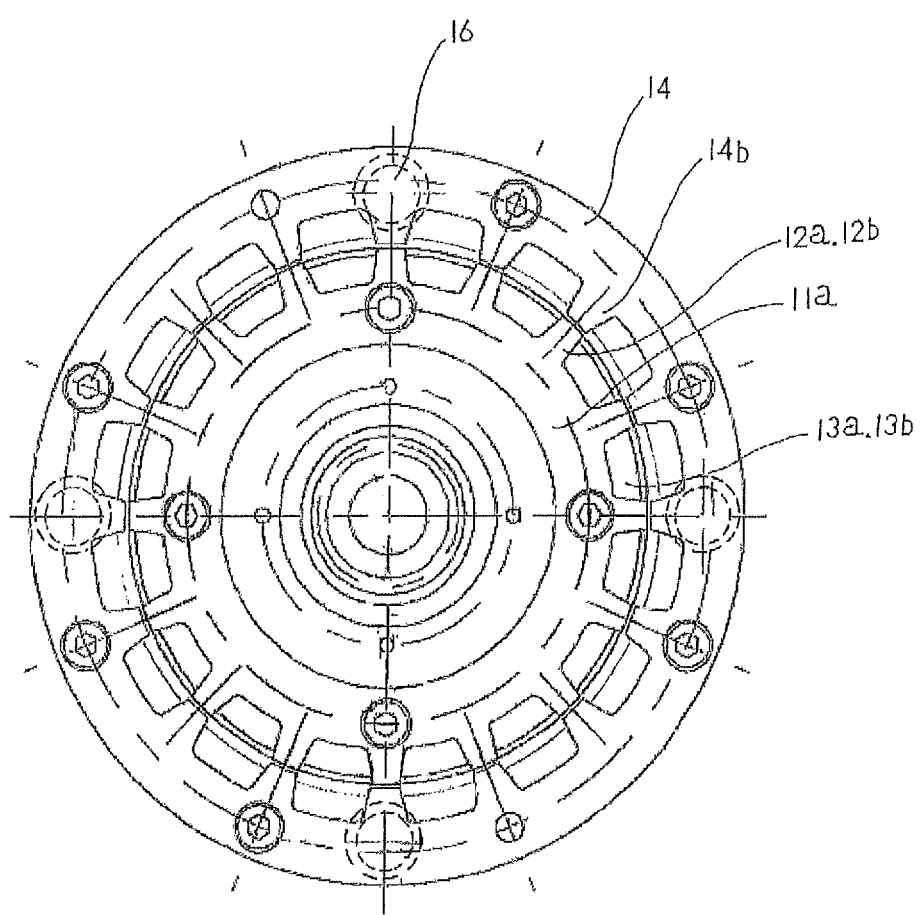
FIG. 2 is an enlarged explanatory configuration drawing illustrating low-torque input means, a yoke rotating body, a side magnetic body, and a magnetic pole rotating body of FIG. 1.
Figure 3:
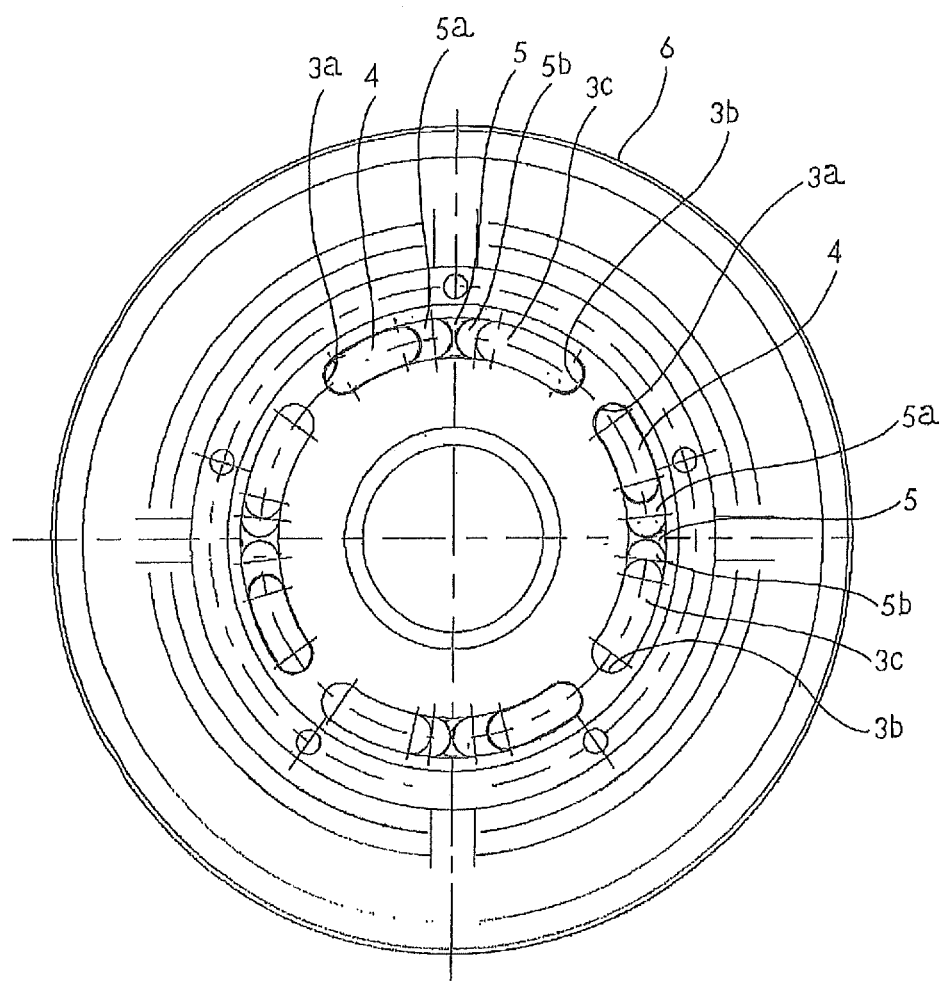
FIG. 3 is an enlarged explanatory configuration drawing illustrating high-torque input means of FIG. 1.
Figure 4:
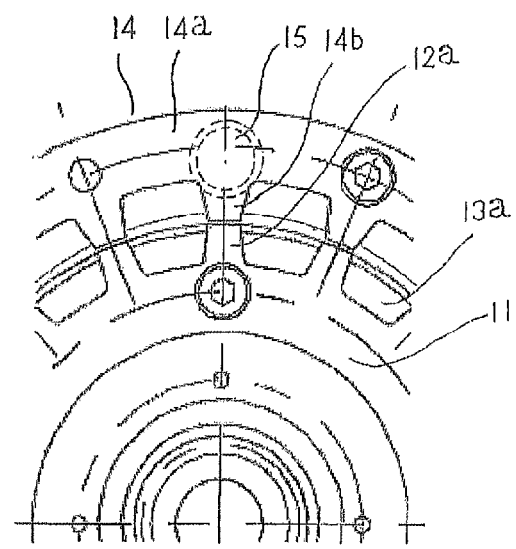
FIG. 4(a) is an explanatory drawing illustrating a state of transmitting a low load (low-load transmitting mode)
FIG. 4(b) is an enlarged explanatory configuration drawing illustrating the low-torque input means, the yoke rotating body, the side magnetic body, the magnetic pole rotating body, and a clutch projection.
Figure 4:
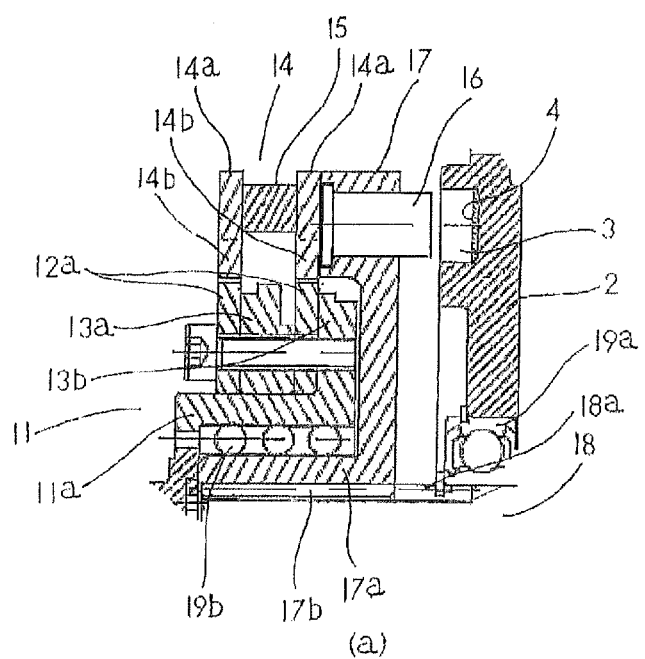
Figure 5:
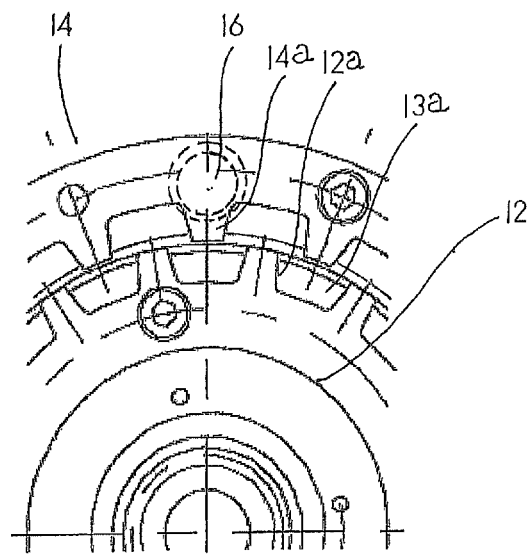
FIG. 5(a) is an explanatory drawing illustrating a state of transmitting a high load (high-load transmitting mode)
FIG. 5(b) is an enlarged explanatory configuration drawing illustrating the low-torque input means, the yoke rotating body, the side magnetic body, the magnetic pole rotating body, and the clutch projection.
Figure 5:
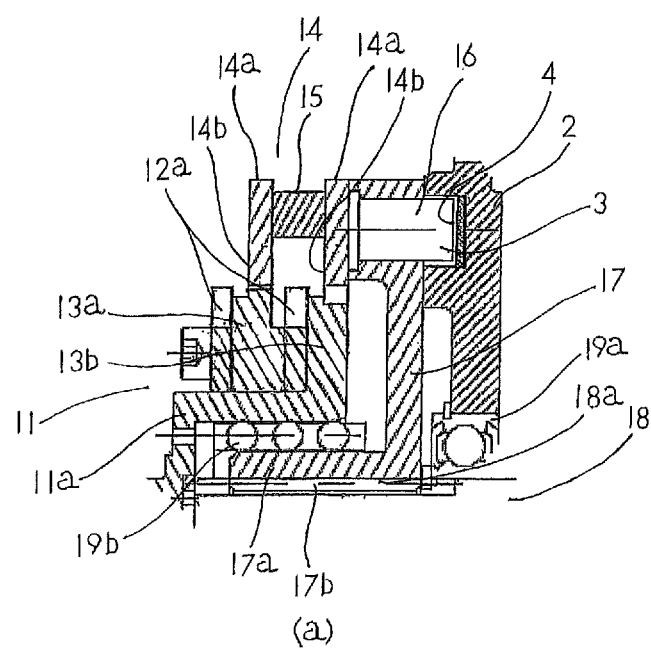
Figure 6:
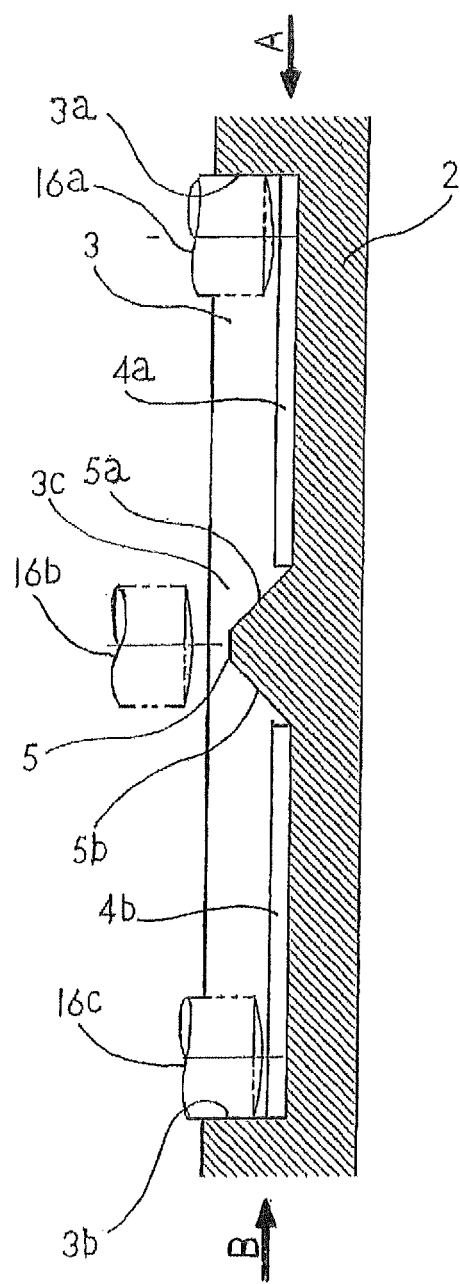
FIG. 6 is an explanatory configuration drawing illustrating a clutch disengagement projection.

In FIG. 1, reference sign 1 denotes a non-magnetic input member having a hollow shaft shape secured on rotational torque input 6 described later, reference sign 2 denotes a high-torque input member coupled to the rotational torque input means 6, reference sign 3 denotes an engaging depression configuring a torque transmitting engaging portion of a claw clutch provided on the high-torque input member 2, formed of an engaging depression engaging a clutch projection 16 of the claw clutch described later (clutch engaging portion), and including forward rotation torque transmitting side surfaces 3a configured to engage the clutch projection 16 when the high-torque input member 2 rotates in the forward direction and reverse rotation torque transmitting side surfaces 3b configured to engage the clutch projection 16 when the high-torque input member 2 rotates in the reverse direction as illustrated in FIG. 3. Reference sign 4 denotes a clutch retaining magnetic body provided on a bottom surface of the depressed portion of the engaging depression 3 and is configured to attract the clutch projection 16, described later. The clutch projection 16 is formed of a ferromagnetic body excited by a permanent magnet 15, and is configured to be attracted by the clutch retaining magnetic body 4 when the clutch projection 16 moves toward the engaging depression 3 of the high-torque input member 2 through a clutch switching action, described later, and is retained by the same. The clutch projection 16 and the clutch retaining magnetic body 4 are preferably attracted each other in a state of having an air gap without being in tight contact with each other in an attracted state. The clutch retaining magnetic body 4 is arranged only on one side; either on the side of the forward rotation torque transmitting side surface 3a or on the side of the reverse rotation torque transmitting side surface 3b as illustrated in FIG. 8. However, as illustrated in FIG. 6 or in FIG. 7, clutch retaining magnetic bodies 4a, 4b may be arranged on both sides; on the side of the forward rotation torque transmitting side surface 3a and on the side of the reverse rotation torque transmitting side surface 3b depending on the type of the load. The high-torque input member 2 is formed of a non-magnetic body except for the clutch retaining magnetic body 4.

Subsequently, modes of the high-torque input member and the clutch retaining magnetic body will be described. In FIG. 8, reference sign 4a denotes the clutch retaining magnetic body having a clutch disengaging bevel $4a_1$ at a center portion (a clutch disengaging portion 3c), having a function to increase an air gap between a distal end of the clutch projection 16 and the clutch retaining magnetic body 4a by rotating the member relative to each other at the time of switching the clutch from a mode of transmitting a high load to a mode transmitting a low load, allowing the clutch projection 16 to move easily to a position where an attracting force from the clutch retaining magnetic body 4a disappears. The clutch disengaging bevel $4a_1$ is configured to cause the high-torque input member 2 to rotate in the direction opposite to the direction of rotation during the previous operation as illustrated in FIG. 6 when switching an output rotating member 17 to torque transmission from the high-torque input member 2 to a low-torque input member 11 when a load torque acting on a magnetic pole rotating body 14 and a yoke rotating body 12 of the output rotating member 17 described later is reduced from a high-load torque to a low-load torque so as to move the clutch projection 16 attracted by the clutch retaining magnetic body 4a on the side of the forward rotation torque transmitting side surface 3a relatively from the forward rotation torque transmitting side surface 3a to the reverse rotation torque transmitting side surface 3b side at the time of forward rotation. During this movement, the distance between the distal end of the clutch projection 16 and the clutch retaining magnetic body 4a is increased by the clutch disengaging bevel $4a_1$, and hence the air gap between the clutch projection 16 and the clutch retaining magnetic body 4a is increased and the attracting force with respect to the clutch retaining magnetic body 4a disappears, so that the clutch is returned and so that a magnetic clutch is switched to the low-load transmitting mode. In the same manner, at the time of the reverse rotation, the clutch projection 16 attracted by the clutch retaining magnetic body 4b on the side of the reverse rotation torque transmitting side surface 3b is moved from the reverse rotation torque transmitting side surface to the forward rotation torque transmitting side surface side. During this movement, the distance between the distal end of the clutch projection 16 and the clutch retaining magnetic body 4b is increased by a disengaging bevel $4b_1$, and hence the air gap between the clutch projection 16 and the clutch retaining magnetic body 4b is increased and the attracting force with respect to the clutch retaining magnetic body 4b disappears, so that the clutch is returned and so that the magnetic clutch is switched to the low-load transmitting mode. Reference sign 16a denotes a clutch projection configured to abut against the forward rotation torque transmitting side surface 3a and transmit a torque.

Reference sign 16b denotes a clutch projection disengaged from the engaging depression 3. Reference sign 16c denotes a clutch projection configured to abut against the reverse rotation torque transmitting side surface 3b and transmit the torque.

Also, after the switching of the clutch, when the load torque is increased, the clutch projection 16 is slid to the engaging depression 3 again, abuts against the forward rotation torque transmitting side surface 3a or the reverse rotation torque transmitting side surface 3b depending on the direction of rotating operation, and transmits a rotational torque.

Figure 7:
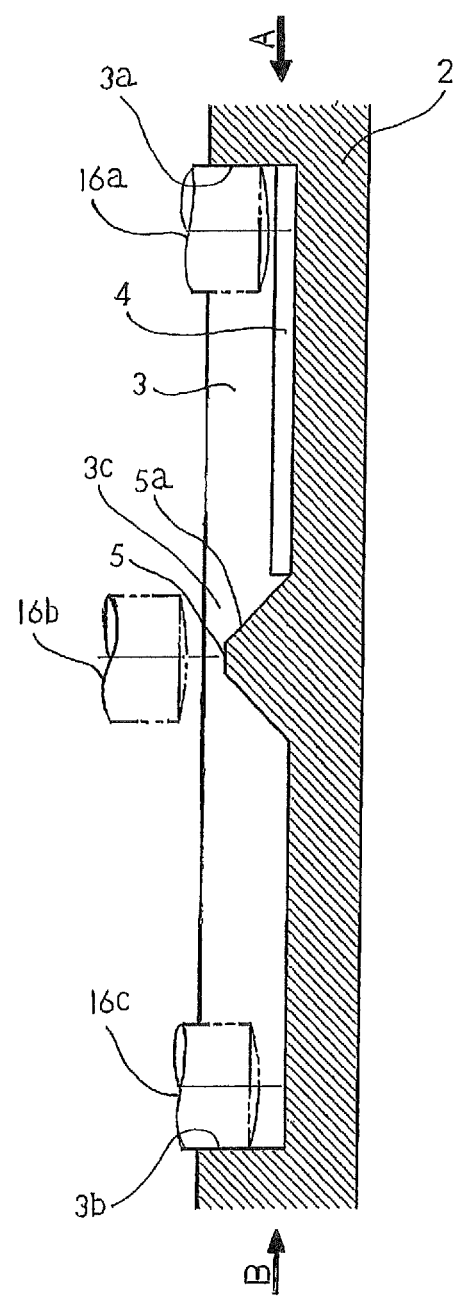
FIG. 7 is an explanatory configuration drawing illustrating the clutch disengagement projection.
Figure 8:
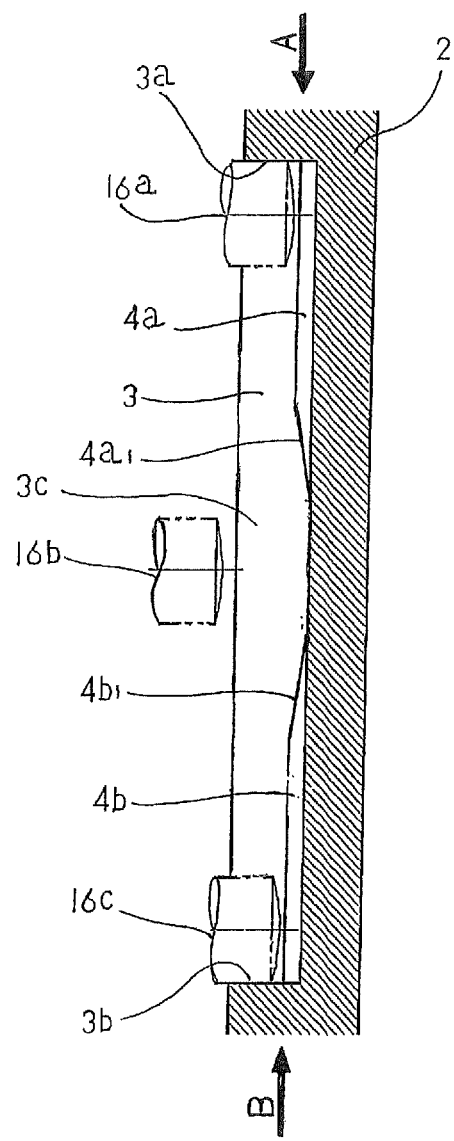
FIG. 8 is an explanatory configuration drawing illustrating a clutch disengaging bevel.

In FIG. 6 and FIG. 7, reference sign 5 denotes a clutch disengagement projection provided on an intermediate portion between the forward rotation torque transmitting side surface 3a and the reverse rotation torque transmitting side surface 3b of the engaging depression 3, and includes a forward rotation disengaging bevel 5a and a reverse rotation disengaging bevel 5b. The clutch disengagement projection 5 moves the clutch projection 16 by rotating the high-torque input means 2 in the direction opposite to the direction of rotation during the previous operation as illustrated in FIG. 6 and FIG. 7 and, with this movement, the clutch projection 16 attracted by the clutch retaining magnetic body 4 abuts against the forward rotation disengaging bevel 5a or the reverse rotation disengaging bevel 5b of the disengagement projection 5 and disengages the clutch projection 16 from the clutch retaining magnetic body 4. Reference sign 16a denotes the clutch projection configured to abut against the forward rotation torque transmitting side surface 3a and transmit the torque. Reference sign 16b denotes the clutch projection disengaged from the clutch retaining magnetic body 4. Reference sign 16c denotes the clutch projection configured to abut against the reverse rotation torque transmitting side surface 3b and transmit the torque.

Even when being disengaged from the engaging depression 3 once, when a load torque exceeding the transmittable torque is applied by a magnetic force, the clutch projection 16 is slid to the interior of the engaging depression 3 again, abuts against the forward rotation torque transmitting side surface 3a or the reverse rotation torque transmitting side surface 3b, depending on the direction of rotating operation, and transmits the rotational torque.

Subsequently, the entire configuration of the load sensitive magnetic clutch device of the present invention will be described. In FIG. 1 to FIG. 5, reference sign 6 denotes the rotational torque input means, which is secured to the input member 1 and the high-torque input member 2 with coupling means, and is axially supported by an outer peripheral frame 20 together with the high-torque input member 2 via a bearing 19e so as to be rotatable. In FIG. 1, a hand wheel to be used in a manual chain block is illustrated. However, any means is applicable as long as it is configured to input a torque such as a flat belt pulley or a gear.

Reference sign 7 denotes a planetary gear mechanism acting as a speed-increasing mechanism, reference sign 7a denotes a planetary carrier coupled to the input member 1, reference sign 7b is a planetary carrier constituting a pair with the planetary carrier 7a, reference sign 7c denotes a planetary gear axially supported by the planetary carriers 7a, 7b so as to be rotatable, reference sign 7d denotes a planetary gear shaft implanted in the planetary carriers 7a, 7b and axially supporting the planetary gear 7c via a bearing, reference 8 denotes a ring gear configured to allow an inscribing engagement of the planetary gear 7c therewith, reference sign 9 denotes a sun gear provided on a sun gear shaft 10, and reference sign 10 denotes the sun gear shaft as an output shaft of the speed-increasing mechanism. The planetary gear 7c comes into a circumscribing engagement with the sun gear 9, comes into inscribing engagement with the ring gear 8, increases the rotation from the planetary carrier 7a, and rotates the sun gear shaft 10 at an increased speed.

Reference sign 11 denotes the low-torque input member coupled to the sun gear shaft, and rotates relative to the rotational torque input member 6 at a high speed at a speed increase ratio of the planetary gear mechanism. Reference sign 11a denotes a boss portion of the low-torque input member.

The low-torque input member 11 is axially supported via a bearing 19b so as to allow the boss portion 11a to rotate relative to the outer periphery of a boss portion 17a of the output rotating member 17 and slide in the axial direction.

Reference sign 12 denotes the yoke rotating body, including tooth-shaped yokes (tooth-shaped magnetic bodies) 12a, 12a provided on the outer periphery of the boss portion 11a of the low-torque input means 11 and including a plurality of tooth tips arranged in two rows on the circumference thereof. The yoke rotating body 12 is preferably formed of a soft magnetic body. Reference sign 13a denotes a doughnut disk-shaped side magnetic body fitted on the boss portion 11a of the low-torque input member 11 on a side surface of one of the tooth-shaped yokes 12a, and reference sign 13b denotes a doughnut disk-shaped side magnetic body fitted on the boss portion 11a of the low-torque input member 11 on a side surface of the other tooth-shaped yoke 12a.

Reference sign 14 denotes the magnetic pole rotating body having magnetic poles 14a, 14a arranged in two rows on the circumference thereof. The magnetic poles 14a are arranged so as to face the outer periphery of the row of the tooth tips of the tooth-shaped yokes 12a. Reference sign 15 denotes the doughnut disk-shaped permanent magnet provided between the pair of magnetic poles 14a, 14a, having an N-pole on one of the side surfaces and an S-pole on the other of the side surfaces. The magnetic poles 14a, 14a are secured on the side surfaces of the doughnut disk-shaped permanent magnet 15, a plurality of tooth-shaped potions 14b, 14b are arranged on the inner periphery of the respective magnetic poles 14a, 14a, and the tooth tips of the tooth-shaped portions 14b are excited in N-poles or S-poles by the permanent magnet 15. The magnetic pole rotating body 14 and the permanent magnet 15 are secured to the output rotating member 17.

Reference sign 16 is the clutch projection formed of a ferromagnetic body and constitutes a claw clutch by being engaged with and disengaged from the engaging depression 3. The clutch projection 16 is provided so as to project from the side surface of the magnetic pole rotating body 14 of the output rotating member 17 toward the engaging depression 3 so as to be excited by the permanent magnet 15, engages the engaging depression 3 provided on the high-torque input member 2 at the time of a high load, and is attracted by the clutch retaining magnetic body 4 with an air gap formed therebetween.

Reference sign 17 denotes the output rotating means provided with the magnetic pole rotating body 14 having the permanent magnet 15 and the clutch projection 16, and reference sign 17a denotes the boss portion of the output rotating member 17. A spline 17b is provided on the inner periphery of the boss portion 17a of the output rotating member 17 so as to be spline-coupled to a spline 18a provided on an output shaft 18, rotates about an identical axial center of rotation 18b to the output shaft 18, transmits the rotational torque from the output rotating member 17 to the output shaft 18, and supports the output rotating member 17 so it is slidable in the axial direction of the output shaft 18. The output rotating member 17 is formed of a non-magnetic body as a material except for the magnetic pole rotating body 14, the permanent magnet 15, and the clutch projection 16.

Reference sign 19a denotes a bearing fitted on the output shaft 18 and configured to axially support the rotational torque input means 6 together with the high-torque input member 2, reference sign 19b denotes the bearing fitted on the boss portion 17a of the output rotating member 17 and configured to axially support the low-torque input member 11, reference sign 19c denotes a bearing axially supporting the input member 1 together with the planetary carrier 7a, and the output shaft 18 is axially supported by the frame with the bearings 19d, 19e. Reference sign 20 denotes the outer peripheral frame.

Subsequently, a switching action of the magnetic clutch mechanism of the present invention will be described.

In a state in which the clutch transmits a low load illustrated in FIGS. 4(a) and (b), the tooth tips of the tooth-shaped portions of the tooth-shaped yokes 12a of the low-torque input member 11 and the tooth tips of the tooth-shaped portions 14b of the magnetic poles 14a provided on the output rotating member 17 face each other, and the tooth-shaped portions 14b of the magnetic poles 14a excited by the permanent magnet 15 and the tooth-shaped yokes 12a provided on the low-torque input member 11 form a magnetic circuit via the air gap between the tooth tips of the both tooth-shaped portions, whereby a strong magnetic attracting force is generated between the both rotating means.

In this state, an attracting force in the direction of the axial center of rotation caused by a magnetic force between the magnetic poles 14a and the tooth-shaped yokes 12a is in balance with the attracting force caused by the magnetic force between the magnetic poles 14a and the side magnetic bodies 13a, 13b in the direction of the axial center of rotation, so that a mechanical restricting means (stopper) against the rotation in the direction of center axis of rotation is not necessary, and the tooth-shaped yokes 12a and the magnetic poles 14a are maintained in a state illustrated in FIG. 4(a) by the magnetic force, and transmits the torque from the tooth-shaped yokes 12a to the magnetic poles 14a, and the tooth-shaped yokes 12a rotate the magnetic poles 14a at the same speed as the low-torque input member 11. Accordingly, the output rotating member 17 rotates at a higher speed than the rotational torque input means 6.

Subsequently, when the load torque is increased, and the load torque exceeds the magnetic attracting force of the tooth-shaped yokes 12a and the magnetic poles 14a, the low-torque input means 11 and the output rotating means 17 rotate relatively to each other, and the magnetic circuit formed among the tooth tips of the both tooth-shaped portions of the magnetic poles 14a and the tooth-shaped yokes 12a is displaced to the magnetic circuit flowing through the side magnetic bodies 13a, 13b. Therefore, a component force of the attracting force caused by the magnetic force between the magnetic poles 14a and the tooth-shaped yokes 12a in the direction of the axial center of rotation is reduced. In contrast, a component force of the attracting force caused by the magnetic force between the magnetic poles 14a and the side magnetic bodies 13a, 13b in the direction of the axial center of rotation is increased. When the component force of the attracting force caused by the magnetic force between the magnetic poles 14a and the side magnetic bodies 13a, 13b in the direction of the axial center of rotation is increased to a level greater than the component force of the attracting force caused by the magnetic force between the magnetic poles 14a and the tooth-shaped yokes 12a in the direction of the axial center of rotation, the magnetic poles 14a slide in the direction of the axial center of rotation, the relative position between the magnetic poles 14a and the tooth-shaped yokes 12a is displaced, whereby the magnetic circuit is formed between the tooth-shaped portion of the magnetic poles 14a and the side magnetic bodies 13a, 13b as illustrated in FIG. 5(a). The clutch projection 16 then engages the engaging depression 3 of the high-torque input member 2 which rotates at the same speed as the rotational torque input 6, is attracted by the clutch retaining magnetic body 4, and is switched to a high-load low-speed rotation.

When the tooth-shaped yokes 12a and the magnetic poles 14a rotate relatively to each other, since the magnetic attracting force applied between the member is reduced by a significant amount, it is possible to set the distance between the clutch projection 16 and the clutch retaining magnetic body 4 to be short, and to set the magnetic attracting force acting between the clutch projection 16 and the clutch retaining magnetic body 4 in the direction of the axial center of rotation to be larger than the magnetic attracting force in the direction of the axial center of rotation acting between the tooth-shaped yokes 12a and the magnetic poles 14a when the tooth-shaped yokes 12a and the magnetic poles 14a rotate relative to each other using the difference, and the side magnetic bodies 13a, 13b are not necessarily required. However, in order to achieve a reliable switching action and set the sliding amount in the direction of the axial center of rotation to be large, provision of a side magnetic body 13 is preferable.

When the magnetic poles 14a slide and rotate in the state facing the side magnetic bodies 13a, 13b, the clutch projection 16 engages the forward rotation torque transmitting side surface 3a or the reverse rotation torque transmitting side surface 3b of the engaging depression 3 of the high-torque input member 2, the clutch projection 16 is attracted by the clutch retaining magnetic body 4, and the output rotating member 17 rotates integrally with the high-torque input member 2 at the same speed.

At the time of the high-load rotation as well, the magnetic poles 14a and the tooth-shaped yokes 12a rotate continuously and relatively to each other, and the largest thrust force is generated between the tooth-shaped portions of the magnetic poles 14a and the tooth-shaped yokes 12a when the tooth-shaped portions 14b of the magnetic poles 14a and the tooth-shaped portion of the tooth-shaped yokes 12a are in a state of facing each other, and the thrust force is minimized when the crests (tooth tips) of the magnetic poles 14a and the troughs of the tooth-shaped yokes 12a (tooth bottoms) face each other.

Subsequently, when the load is reduced to a predetermined torque or lower, the teeth tips of the tooth-shaped portions of both of the magnetic poles 14a and the tooth-shaped yokes 12a attract each other by magnetic forces, the teeth tips are aligned in position in the circumferential direction and face each other, and the magnetic circuit formed between the magnetic poles 14a and the side magnetic bodies 13a, 13b is switched to a magnetic circuit flowing through the tooth tips of the tooth-shaped portion of the tooth-shaped yokes 12a. Therefore, the component force in the direction of the axial center of rotation of the attracting force generated by the magnetic force of the magnetic poles 14a and the tooth-shaped yokes 12a is increased, the component force in the direction of the axial center of rotation of the attracting force generated by the magnetic force of the magnetic poles 14a and the side magnetic bodies 13a, 13b is decreased, a returning thrust force is generated since the component force of the attracting force generated by the magnet force of the magnetic poles 14a and the tooth-shaped yokes 12a in the direction of the axial center of rotation is larger than the component force in the direction of the axial center of rotation of the attracting force generated by the magnetic force of the magnetic poles 14a and the side magnetic bodies 13a, 13b. Therefore, the magnetic poles 14a are slid to a position facing the tooth-shaped yokes 12a of the low-torque input means 11, and try to return back to the low-load mode. However, since the clutch projection 16 is attracted to the clutch retaining magnetic body 4 by the magnetic force, the engagement of the claw clutch is maintained.

By rotating the high-torque input member 2 in the direction opposite to the direction of rotation of the previous operation by the rotational torque input 6 when switching from a high-load transmitting mode to the low-load transmitting mode, as illustrated in FIG. 8, the relative position of the clutch projection 16 is moved by moving the clutch projection 16a abutting against the forward rotation torque transmitting side surface 3a of the engaging depression 3 provided on the high-torque input means 2 to the clutch projection 16b abutting against the reverse rotation torque transmitting side surface 3b, and when the clutch projection 16 is moved, the distance between the distal end of the clutch projection 16 and the clutch retaining magnetic body 4a is gradually increased by the clutch disengaging bevel $4a_1$. Therefore, the air gap between the distal end of the clutch projection 16 and the clutch retaining magnetic body 4a is increased, the attracting force (retaining force) between the clutch projection 16 and the clutch retaining magnetic body 4a is decreased, and the magnetic poles 14a of the magnetic pole rotating body 14 are attracted by the tooth-shaped yokes 12a of the low-torque input member 11 and slide to a position facing thereto, so that the mode is switched to the low-load transmitting mode.

Also, as illustrated in FIG. 6 and FIG. 7, when the claw clutch disengagement projection 5 is provided in the intermediate portion between the forward rotation torque transmitting side surface 3a and the reverse rotation torque transmitting side surface 3b, the high-torque input member 2 is rotated in the direction opposite to the direction of rotation of the previous operation by the rotation of torque input 6. Accordingly, as illustrated in FIG. 6 and FIG. 7, when the clutch projection 16 is moved from the forward rotation torque transmitting side surface 3a to the reverse rotation torque transmitting side surface 3b of the engaging depression 3 provided on the high-torque input member 2, at the time of this movement, the clutch projection 16 abuts against the forward rotation disengaging bevel 5a of the clutch disengagement projection 5 and is disengaged from the clutch retaining magnetic body 4 by being guided by the bevel, and the magnetic poles 14a of the magnetic pole rotating body 14 slide to a position facing the tooth-shaped yokes 12a of the low-torque input member 11, so that the mode is switched to the low-load transmitting mode, and the output shaft 18 rotates at a speed higher than the rotational torque input 6.

As described thus far, according to the present invention, when the magnetic poles 14a provided on the output rotating member 17 and the tooth-shaped yokes 12a provided on the low-torque input member 11 are rotated relatively to each other by the load applied on the magnetic poles 14a of the output rotating member 17, the output rotating member 17 is coupled to the high-torque input 2 by the claw clutch including the clutch projection 16 and the engaging depression 3 by the sliding movement of the magnetic poles 14a in the direction of axis of rotation by using the thrust force generated by the magnetic force of the permanent magnet 15. Therefore, a thrust conversion mechanism provided separately, which is required in the device of the related art, is not necessary to be provided, so that the number of components is reduced, the structure is simplified, a reduction in size and weight is enabled, and the manufacturing cost is significantly reduced. Also, at the time of high load, the clutch projection 16 provided on the magnetic poles 14a is engaged with the high-torque input means 2 by a thrust force generated by the relative rotation between the magnetic poles 14a and the tooth-shaped yokes 12a, and hence the power transmission may be performed accurately at the time of high-load as well, and also the switching of the clutch may be performed at a high response.

In addition, since the clutch retaining magnetic body 4 is provided on the torque transmitting engaging portion 3 of the high-torque input member 2, the clutch projection 16 is attracted by the clutch retaining magnetic body 4 when the output rotating means 17 switches from the low-torque input member 11 to the high-torque input member 2, a switching action may be performed quickly and reliably by the clutch projection 16. Also, since the clutch projection 16 is constantly attracted by the clutch retaining magnetic body 4 when being operated at the high-load transmitting mode, the occurrence of clutch return due to the variability of the load applied to the clutch may be prevented. Also, since the disengaging bevels $4a_1$, $4b_1$ with respect to the clutch projection 16 are provided on the clutch retaining magnetic body 4, the operation for switching the transmitting route of the output rotating member 17 from the transmission to the high-torque input member 2 to the transmission to the low-torque input member 11 due to the reduction of the torque between the output rotating member 17 and the high-torque input member 2 is performed by moving the clutch projection 16 in a direction of moving away from the forward rotation torque transmitting side surface 3a or the reverse rotation torque transmitting side surface 3b by rotating the high-torque input member 2 in a direction opposite to the direction of rotation performed in the previous operation. At the time of this action of movement, the distance between the distal end of the clutch projection 16 and the clutch retaining magnetic body 4, the air gap, is gradually increased by the disengaging bevels $4a_1$, $4b_1$, and hence the magnetic force in the circumference direction is not generated and the attracting force between the clutch projection 16 and the clutch retaining magnetic body 4 is reduced. The output rotating member 17 is then switched from the transmitting position to the high-torque input member 2 to the transmitting position to the low-torque input member 11, so that switching to the low-load transmitting (high speed) mode is smoothly achieved.

In addition, since the clutch disengagement projection 5 is provided at the intermediate portion between the forward rotation torque transmitting side surface 3a and the reverse rotation torque transmitting side surface 3b of the torque transmitting engaging portion 3, the operation for switching the transmitting route of the output rotating member 17 from the transmission to the high-torque input member 2 to the transmission to the low-torque input member 11 is performed by rotating the high-torque input member 2 in a direction opposite to the direction of rotation performed in the previous operation to move the clutch projection 16 in a direction of moving away from the forward rotation torque transmitting side surface 3a or the reverse rotation torque transmitting side surface 3b and, at the time of this action of movement, the clutch projection 16 abuts against the clutch disengagement projection 5 and moves the clutch projection 16 away from the clutch retaining magnetic body 4, the output rotating member 17 is switched from the transmitting position to the high-torque input member 2 to the transmitting position to the low-torque input member 11, so that switching to the low-load transmitting (high speed) mode is smoothly achieved.

REFERENCE SIGNS LISTS 1 input member
2 high-torque input member
3 engaging depression
3a forward rotation torque transmitting side surface
3b reverse rotation torque transmitting side surface
3c claw clutch disengaging portion
4 clutch retaining magnetic body
4a clutch disengaging bevel
5 clutch disengagement projection
5a forward rotation disengaging bevel
5b reverse rotation disengaging bevel
6 rotational torque input member
11 low-torque input member
12 yoke rotating body
12a tooth-shaped yoke
13 side magnetic body
14 magnetic pole rotating body
14a magnetic pole
14b tooth-shaped portion
16 clutch projection
17 output rotating member
18 output shaft
18b axial center of rotation

The invention claimed is:

1. A load sensitive magnetic clutch device, comprising:
an output rotating member having a claw clutch projection at an end thereof, and having a magnetic pole rotating body that has magnetic poles arranged on a circumference of the magnetic pole rotating body and that is configured to rotate about an axial center of rotation;
a low-torque input member having a yoke rotating body that is configured to rotate about the axial center of rotation of the magnetic pole rotating body, wherein the yoke rotating body includes a tooth-shaped portion that has tooth tips configured to face the magnetic poles of said magnetic pole rotating body to transmit a torque between the tooth tips of the yoke and said magnetic pole rotating body by a magnetic attracting force; and
a high-torque input member configured to rotate about the axial center of rotation, said high-torque input member having a claw clutch engaging portion arranged to engage said claw clutch projection on said output rotating member;
wherein said claw clutch engaging portion of said high-torque input member includes:
a clutch retaining magnetic body that is arranged to attract said claw clutch projection with magnetic force,
a forward rotating torque transmitting side surface arranged to engage said clutch projection when said high-torque input member rotates in a forward direction, and
a reverse rotation torque transmitting side surface arranged to engage said clutch projection when said high-torque input member rotates in a reverse direction;
wherein said claw clutch projection is formed of a magnetic body;
wherein said clutch retaining magnetic body of said claw clutch engaging portion comprises a claw clutch disengaging portion configured to reduce an attracting force caused by the magnetic force between said claw clutch projection and said clutch retaining magnetic body at an intermediate portion between said forward rotation torque transmission side surface and said reverse rotation torque transmitting side surface; and wherein said claw clutch projection is arranged with said output rotating member so as to be attracted by said clutch retaining magnetic body upon application of a load torque exceeding a torque which is transferrable between said magnetic pole rotating body and said low-torque input member.

2. The load sensitive magnetic clutch device according to claim 1, and further comprising hollow disk-shaped side magnetic bodies mounted on said yoke rotating body and disposed at a side of said tooth-shaped portion facing toward said high-torque input member.

3. The load sensitive magnetic clutch device according to claim 1, wherein said claw clutch disengaging portion comprises a clutch disengaging bevel provided at a center portion of said clutch retaining magnetic body and arranged to reduce the attracting force caused by the magnetic force between said claw clutch projection and said clutch retaining magnetic body.

4. The load sensitive magnetic clutch device according to claim 1, wherein said claw clutch disengaging portion comprises a claw clutch disengagement projection positioned and arranged to engage said claw clutch projection to disengage the attracting force caused by the magnetic force between said claw clutch projection and said clutch retaining magnetic body.

5. The load sensitive magnetic clutch device according to claim 1, wherein said clutch retaining magnetic body is provided only at one position of a first position between said forward rotation torque transmitting side surface and said claw clutch disengaging portion and a second position between said reverse rotation transmitting side surface and said claw clutch disengaging portion.

6. The load sensitive magnetic clutch device according to claim 2, wherein said clutch retaining magnetic body is provided only at one position of a first position between said forward rotation torque transmitting side surface and said claw clutch disengaging portion and a second position between said reverse rotation transmitting side surface and said claw clutch disengaging portion.

* * * * *